United States Patent
Gu et al.

(10) Patent No.: US 8,837,112 B2
(45) Date of Patent: Sep. 16, 2014

(54) MULTILAYER CERAMIC ELECTRONIC COMPONENT AND METHOD OF FABRICATING THE SAME

(75) Inventors: Hyun Hee Gu, Gyunggi-do (KR); Myung Jun Park, Gyunggi-do (KR); Kyu Ha Lee, Gyunggi-do (KR); Da Young Choi, Gyunggi-do (KR); Jae Young Park, Gyunggi-do (KR); Sang Hoon Kwon, Gyunggi-do (KR); Byung Jun Jeon, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 180 days.

(21) Appl. No.: 13/620,635

(22) Filed: Sep. 14, 2012

(65) Prior Publication Data

US 2014/0002950 A1    Jan. 2, 2014

(30) Foreign Application Priority Data

Jun. 28, 2012  (KR) ........................ 10-2012-0070184

(51) Int. Cl.
*H01G 4/06*       (2006.01)
*H01G 4/30*       (2006.01)
*H01G 4/005*      (2006.01)

(52) U.S. Cl.
CPC . *H01G 4/30* (2013.01); *H01G 4/005* (2013.01)
USPC .................. 361/321.2; 361/321.1; 361/301.2; 361/301.4; 361/306.1; 361/306.3

(58) Field of Classification Search
CPC ........... H01G 4/30; H01G 4/005; H01G 4/12; H01G 4/228; H01G 4/232
USPC ........... 361/321.2, 321.1, 303–305, 311–313, 361/306.1, 306.3, 301.2–301.4
See application file for complete search history.

(56) References Cited

U.S. PATENT DOCUMENTS

| | | | |
|---|---|---|---|
| 6,243,252 B1* | 6/2001 | Kuroiwa et al. | 361/303 |
| 6,550,117 B1* | 4/2003 | Tokuoka et al. | 29/25.42 |
| 7,304,831 B2* | 12/2007 | Yoshii et al. | 361/321.2 |
| 7,659,568 B2* | 2/2010 | Kusano et al. | 257/307 |
| 8,174,816 B2* | 5/2012 | Seo et al. | 361/321.2 |
| 8,179,660 B2* | 5/2012 | Katsube et al. | 361/306.1 |
| 8,649,155 B2* | 2/2014 | Sasaki | 361/303 |

FOREIGN PATENT DOCUMENTS

| | | | |
|---|---|---|---|
| JP | 2000-077258 A | 3/2000 | |
| JP | 2003-323817 A | 11/2003 | |

* cited by examiner

Primary Examiner — Nguyen T Ha
(74) Attorney, Agent, or Firm — McDermott Will & Emery LLP (57) ABSTRACT

There is provided a multilayer ceramic electronic component, including: a ceramic body including a dielectric layer; a plurality of internal electrodes disposed to face each other within the ceramic body, having the dielectric layer interposed therebetween; and external electrodes electrically connected to the internal electrodes, wherein the ceramic body includes an active layer corresponding to a capacitance forming part and a cover layer formed on at least one of an upper surface and a lower surface of the active layer and corresponding to a non-capacitance forming part, an average thickness of the cover layer is 15 μm or less, the external electrodes include a conductive metal and a glass, and when an area of the external electrodes occupied by the glass is A and an area thereof occupied by the conductive metal is B, $0.05 \leq A/B \leq 0.6$ is satisfied.

12 Claims, 3 Drawing Sheets

MULTILAYER CERAMIC ELECTRONIC COMPONENT AND METHOD OF FABRICATING THE SAME

CROSS-REFERENCE TO RELATED APPLICATIONS

This application claims the priority of Korean Patent Application No. 10-2012-0070184 filed on Jun. 28, 2012, in the Korean Intellectual Property Office, the disclosure of which is incorporated herein by reference.

BACKGROUND OF THE INVENTION

1. Field of the Invention

The present invention relates to a multilayer ceramic electronic component having improved reliability by preventing the permeation of a plating solution thereinto.

2. Description of the Related Art

In accordance with the recent trend for the miniaturization of electronic products, demand for a small multilayer ceramic electronic component having a large capacitance has increased.

In accordance with the demand for a small multilayer ceramic electronic component having a large capacitance, an external electrode of the multilayer ceramic electronic component has also been thinned.

An external electrode paste contains a conductive metal such as copper (Cu) as a main material to thereby ensure chip sealing properties and electrical conductivity between the external electrode and a chip and contains glass as an auxiliary material to provide adhesion between the external electrode and the chip, simultaneously with filling empty spaces due to sintering shrinkage of metal.

However, in the case in which a content of glass in the external electrode paste is insufficient, chip sealing properties may be defective. In the case of adding an excessive amount of glass in order to enhance chip sealing properties, a defect such as a plating defect may occur due to the elution of glass to a surface after sintering.

Particularly, in accordance with thinness of the external electrode, it is difficult to implement a desired level of compactness, and a possibility that a defect will occur due to a deficiency or excess of glass, owing to high temperature behavior characteristics of the glass, increases.

In addition, in the case in which a shape of an external electrode is irregular, a possibility of a plating solution being permeated thereinto through a thin portion thereof is significantly increased, such that reliability may not be secured.

RELATED ART DOCUMENT (Patent Document 1) Japanese Patent Laid-Open Publication No. JP 2000-077258
(Patent Document 2) Japanese Patent Laid-Open Publication No. JP 2003-323817

SUMMARY OF THE INVENTION

An aspect of the present invention provides a multilayer ceramic electronic component having improved reliability by preventing the permeation of a plating solution.

According to an aspect of the present invention, there is provided a multilayer ceramic electronic component, including: a ceramic body including a dielectric layer; a plurality of internal electrodes disposed to face each other within the ceramic body, having the dielectric layer interposed therebetween; and external electrodes electrically connected to the plurality of internal electrodes, wherein the ceramic body includes an active layer corresponding to a capacitance forming part and a cover layer formed on at least one of an upper surface and a lower surface of the active layer and corresponding to a non-capacitance forming part, an average thickness of the cover layer in a cross-section of the ceramic body in length and thickness directions taken in a central portion of the ceramic body in a width direction is 15 μm or less, the external electrodes include a conductive metal and a glass, and when an area of the external electrodes occupied by the glass is A and an area thereof occupied by the conductive metal is B, $0.05 \leq A/B \leq 0.6$ is satisfied.

When a thickness of the external electrode in the central portion of the ceramic body in the thickness direction is Tc and a thickness of the external electrode at a point spaced apart from a central portion of the capacitance forming part by a distance equal to 25% of a length of the ceramic body in the thickness direction is T1, $T1/Tc \geq 0.8$ may be satisfied.

When a thickness of the external electrode in the central portion of the ceramic body in the thickness direction is Tc and a thickness of the external electrode at the outermost point of the capacitance forming part at which the plurality of internal electrodes are formed is T2, $T2/Tc \geq 0.5$ may be satisfied.

The glass may have a content of 30 to 200 volume % based on the conductive metal.

The conductive metal may be at least one selected from a group consisting of copper (Cu), nickel (Ni), silver (Ag), and silver-palladium (Ag—Pd).

The glass may have insulating properties.

According to another aspect of the present invention, there is provided a method of fabricating a multilayer ceramic electronic component, the method including: preparing a ceramic body including a dielectric layer and a plurality of internal electrodes disposed to face each other, having the dielectric layer interposed therebetween; applying an external electrode paste to the ceramic body to be electrically connected to the plurality of internal electrodes; and forming external electrodes by sintering the ceramic body, wherein the ceramic body includes an active layer corresponding to a capacitance forming part and a cover layer formed on at least one of an upper surface and a lower surface of the active layer and corresponding to a non-capacitance forming part, an average thickness of the cover layer in a cross-section of the ceramic body in length and thickness directions taken in a central portion of the ceramic body in a width direction is 15 μm or less, the external electrodes include a conductive metal and a glass, and when an area of the external electrodes occupied by the glass is A and an area thereof occupied by the conductive metal is B, $0.05 \leq A/B \leq 0.6$ is satisfied.

When a thickness of the external electrode in the central portion of the ceramic body in the thickness direction is Tc and a thickness of the external electrode at a point spaced apart from a central portion of the capacitance forming part by a distance equal to 25% of a length of the ceramic body in the thickness direction is T1, $T1/Tc \geq 0.8$ may be satisfied.

When a thickness of the external electrode in the central portion of the ceramic body in the thickness direction is Tc and a thickness of the external electrode at the outermost point of the capacitance forming part at which the plurality of internal electrodes are formed is T2, $T2/Tc \geq 0.5$ may be satisfied.

The glass may have a content of 30 to 200 volume % based on the conductive metal.

The conductive metal may be at least one selected from a group consisting of copper (Cu), nickel (Ni), silver (Ag), and silver-palladium (Ag—Pd).

The glass may have insulating properties.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Embodiments of the present invention will now be described in detail with reference to the accompanying drawings.

Figure 1:
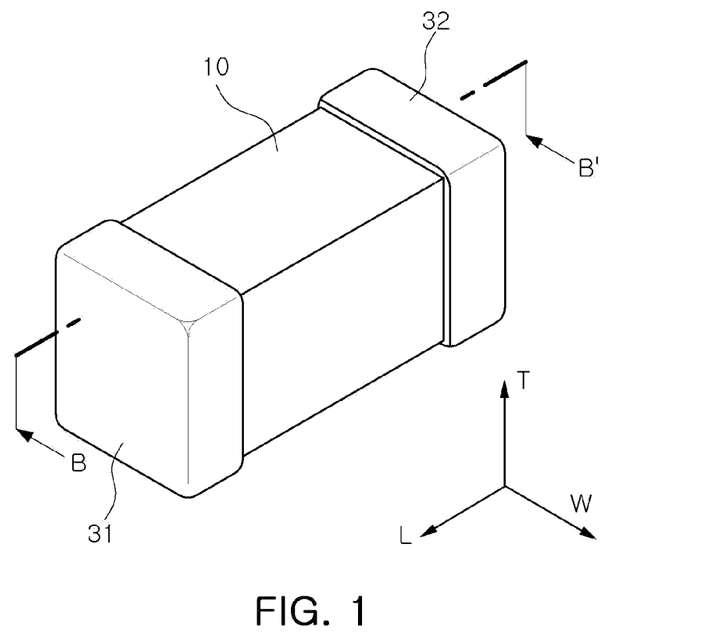
FIG. 1 is a perspective view schematically showing a multilayer ceramic capacitor according to an embodiment of the present invention.

FIG. 1 is a perspective view schematically showing a multilayer ceramic capacitor according to an embodiment of the present invention.

Figure 2:
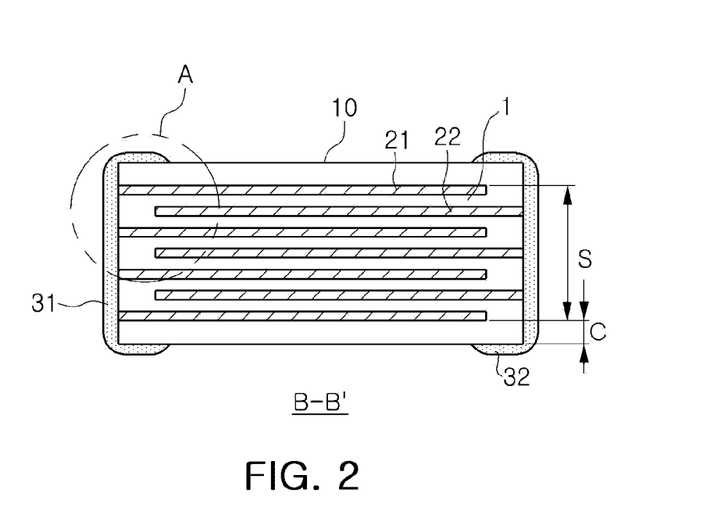
FIG. 2 is a cross-sectional view taken along line B-B' of FIG. 1.

FIG. 2 is a cross-sectional view taken along line B-B' of FIG. 1.

Figure 3:
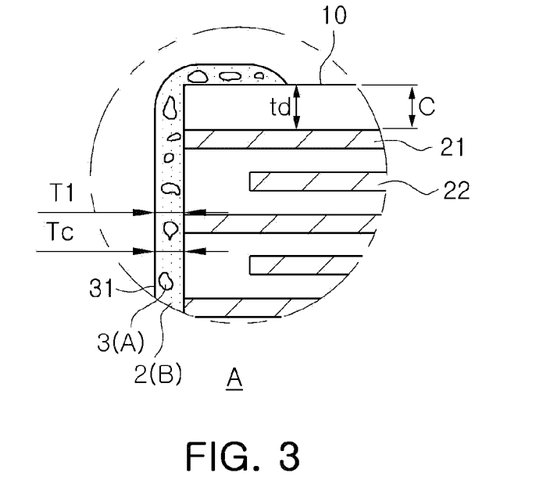
FIG. 3 is an enlarged view of part A of FIG. 2 according to the embodiment of the present invention.

FIG. 3 is an enlarged view of part A of FIG. 2 according to the embodiment of the present invention.

Referring to FIGS. 1 through 3, a multilayer ceramic electronic component according to the embodiment of the present invention may include: a ceramic body 10 including a dielectric layer 1; a plurality of internal electrodes 21 and 22 disposed in the ceramic body 10 to face each other, having the dielectric layer 1 interposed therebetween; and external electrodes 31 and 32 electrically connected to the plurality of internal electrodes 21 and 22, wherein the ceramic body 10 includes an active layer corresponding to a capacitance forming part and a cover layer C formed on at least one of an upper surface and a lower surface of the active layer and corresponding to a non-capacitance forming part, an average thickness td of the cover layer C in a cross-section of the ceramic body 10 in length and thickness (L-T) directions taken in a central portion of the ceramic body 10 in a width (W) direction thereof is 15 μm or less, the external electrodes 31 and 32 include a conductive metal 2 and a glass 3, and when an area of the external electrodes 31 and 32 occupied by the glass 3 is A and an area thereof occupied by the conductive metal 2 is B, $0.05 \leq A/B \leq 0.6$ is satisfied.

Hereinafter, a multilayer ceramic electronic component according to an embodiment of the present invention will be described. In particular, a multilayer ceramic capacitor will be described. However, the present invention is not limited thereto.

In a multilayer ceramic capacitor according to an embodiment of the present invention, a 'length direction' refers to an 'L' direction of FIG. 1; a 'width direction' refers to a 'W' direction of FIG. 1; and a 'thickness direction' refers to a 'T' direction of FIG. 1. Here, the 'thickness direction' refers to a direction in which dielectric layers are laminated, that is, a 'lamination direction'.

According to the embodiment of the present invention, a raw material for forming the dielectric layer 1 is not particularly limited as long as a sufficient amount of capacitance can be obtained therewith. For example, barium titanate ($BaTiO_3$) powder may be used therefor.

As a material for forming the dielectric layer 1, various ceramic additives, organic solvents, plasticizers, binders, dispersants, or the like may be added to powder such as the barium titanate ($BaTiO_3$) powder or the like, depending on the purpose of the present invention.

A material for forming the plurality of internal electrodes 21 and 22 is not specifically limited, but may be a conductive paste made of at least one of, for example, silver (Ag), lead (Pb), platinum (Pt), nickel (Ni), and copper (Cu).

The multilayer ceramic capacitor according to the embodiment of the present invention may include the external electrodes 31 and 32 electrically connected to the plurality of internal electrodes 21 and 22.

According to the embodiment of the present invention, the ceramic body may include an active layer corresponding to a capacitance forming part and a cover layer C formed on at least one of an upper surface and a lower surface of the active layer and corresponding to a non-capacitance forming part, and an average thickness td of the cover layer C in a cross-section of the ceramic body 10 in length and thickness (L-T) directions taken in a central portion of the ceramic body 10 in a width (W) direction thereof may be 15 μm or less.

The active layer corresponding to the capacitance forming part may be a region in which the plurality of internal electrodes 21 and 22 overlap each other within the ceramic body 10.

The average thickness td of the cover layer C may be measured from an image obtained by scanning a cross-section of the multilayer ceramic capacitor in a length direction using a scanning electron microscope (SEM), as shown in FIG. 2.

More specifically, the average thickness td of the cover layer C may be obtained by measuring thicknesses of the cover layer C at certain points of the cross-section of the cover layer C extracted from the image obtained by scanning the cross section of the multilayer ceramic capacitor in the length and thickness (L-T) directions taken in the central portion of the multilayer ceramic capacitor in the width (W) direction thereof using the SEM, as shown in FIG. 2.

In general, in the case in which the average thickness td of the cover layer C in the cross-section of the ceramic body in the length and thickness (L-T) directions taken in the central portion of the ceramic body in the width (W) direction thereof is 15 μm or less, a possibility in which a plating solution is permeated into the multilayer ceramic capacitor may be increased.

However, according to embodiments of the present invention to be described below, the plating solution is not permeated even in the case in which the average thickness td of the cover layer C is 15 μm or less, such that a multilayer ceramic electronic component having excellent reliability may be realized.

Meanwhile, in the case in which the average thickness td of the cover layer C exceeds 15 μm, the average thickness of the cover layer C is thick, such that the plating solution may not be permeated.

In addition, the external electrodes 31 and 32 may include the conductive metal 2 and the glass 3.

The conductive metal 2 is not specifically limited, but may be, for example, at least one selected from a group consisting of copper (Cu), nickel (Ni), silver (Ag), and sliver-palladium (Ag—Pd).

The glass 3 may be an insulating glass, but is not limited thereto.

The external electrodes may include the conductive metal 2 and the glass 3, and when it is assumed that the area of each external electrode occupied by the glass 3 is A and the area thereof occupied by the conductive metal 2 is B, $0.05 \leq A/B \leq 0.6$ may be satisfied.

A ratio of the area A occupied by the glass 3 to the area B occupied by the conductive metal 2 may be obtained from the image obtained by scanning the cross-section of the ceramic body 10 in the length direction using the SEM, as shown in FIG. 2.

More specifically, the ratio of the area A occupied by the glass 3 to the area B occupied by the conductive metal 2 may be obtained from the cross-section of the external electrode extracted from the image obtained by scanning the cross section of the ceramic body 10 in the length and thickness (L-T) directions taken in the central portion of the ceramic body 10 in the width (W) direction thereof using the SEM, as shown in FIG. 2.

The measuring of the area A occupied by the glass 3 to the area B occupied by the conductive metal 2 is not specifically limited. For example, the ratio thereof may be obtained based on a ratio of the area A occupied by the glass 3 to a portion of the cross-section of the external electrode 31 having an area of 150 μm×10 μm.

That is, the area B occupied by the conductive metal 2 may be obtained by subtracting the area A occupied by the glass 3 from the 150 μm×10 μm area of the external electrode.

In addition, the ratio of the area A occupied by the glass 3 to the area B occupied by the conductive metal 2 may be obtained with respect to the overall area of the external electrode, rather than the 150 μm×10 μm area.

The ratio of the area A occupied by the glass 3 to the area B occupied by the conductive metal 2 satisfies $0.05 \leq A/B \leq 0.6$, such that the permeation of the plating solution may be prevented, whereby a multilayer ceramic capacitor having excellent reliability may be implemented.

In the case in which the ratio of the area A occupied by the glass 3 to the area B occupied by the conductive metal 2 is less than 0.05, the content of the glass may be low, such that reliability may be deteriorated due to the permeation of the plating solution.

In addition, in the case in which the ratio of the area A occupied by the glass 3 to the area B occupied by the conductive metal 2 exceeds 0.6, the content of the glass may be excessively high, such that non-plating defects may be generated due to the elution of the glass and a level of capacitive contact may be deteriorated due to the deterioration of connectivity between the internal electrodes and the external electrodes.

Here, the determination of reliability may be conducted at a rated voltage (or a voltage higher than a rated voltage) under conditions of high temperature and high humidity or by changing the rated voltage under conditions of high temperature. Reliability may be determined by measuring a change in an insulation resistance value in an insulating chip such as a capacitor. In the case in which defects such as cracks, or the like are generated, an insulation resistance value is increased, resulting in defective products.

In addition, the non-plating defects may be determined by immersing the multilayer ceramic capacitor in a solder pot containing molten tin (Sn) and removing it therefrom, to thereby remove a tin (Sn) layer and observe a portion in which a nickel (Ni)-plating layer is not formed. In addition, the non-plating defects may be determined by using X-ray fluorescence spectroscopy (XRF).

The level of capacitive contact is a reference for determining connectivity between the internal electrodes and the external electrodes. All of the multilayer ceramic capacitors have a rated voltage. In the case in which connectivity between the internal electrodes and the external electrodes is decreased, the capacitance of the multilayer ceramic capacitor may be lower than the rated voltage. Therefore, the connectivity between the internal electrodes and the external electrodes may be determined by the level of capacitive contact. In general, in the case in which a large amount of non-conductive glass is present, connections between the internal electrodes and the external electrodes may be blocked.

According to the embodiment of the present invention, when it is assumed that a thickness of each external electrode 31 and 32 in a central portion of the ceramic body 10 in the thickness direction thereof is Tc, and a thickness of each external electrode 31 and 32 at a point spaced apart from a central portion of the capacitance forming part by a distance equal to 25% of a length S of the ceramic body 10 in the thickness direction is T1, $T1/Tc \geq 0.8$ may be satisfied.

The thickness Tc of each external electrode 31 and 32 in the central portion of the ceramic body 10 in the thickness direction refers to a thickness of each external electrode at a point at which an imaginary line is drawn through the ceramic body 10 in the length direction thereof at a central portion point of the ceramic body 10 in the thickness direction.

Meanwhile, the central portion of the capacitance forming part in which the plurality of internal electrodes 21 and 22 are laminated to contribute to forming capacitance refers to a central portion of the capacitance forming part in the thickness direction of the ceramic body 10.

The capacitance forming part may be a region in which the plurality of internal electrodes 21 and 22 overlap each other within the ceramic body 10.

The thickness T1 of each external electrode 31 and 32 at the point spaced apart from the central portion of the capacitance forming part by the distance equal to 25% of the length S of the ceramic body 10 in the thickness direction refers to a thickness of each external electrode at a point at which an imaginary line is drawn through the ceramic body 10 in the length direction thereof at the point spaced apart from the central portion of the capacitance forming part by the distance equal to 25% of the length S.

According to the embodiment of the present invention, a relationship between Tc and T1, $T1/Tc \geq 0.8$ may be satisfied.

A ratio of T1 to Tc satisfies 0.8 or more to thereby decrease deviation between the thickness Tc of the external electrode in the central portion of the ceramic body 10 in the thickness direction and the thickness T1 of the external electrode at the point spaced apart from the central portion of the capacitance forming part in which the internal electrodes are laminated to contribute to forming the capacitance by the distance equal to 25% of the length (S) of the ceramic body 10 in the thickness direction, whereby the deterioration of reliability may be prevented.

In the case in which the ratio of T1 to Tc is less than 0.8, since the deviation in the thickness of the external electrode is large, the plating solution may permeate into a relatively thin portion of the external electrode, such that reliability may be deteriorated.

The thicknesses of the external electrodes 31 and 32 may be measured from the image obtained by scanning the cross-section of the multilayer ceramic capacitor in the length direction using the SEM, as shown in FIG. 2.

More specifically, the thicknesses of the external electrode may be obtained by measuring thicknesses of the external electrode at certain points of the cross section of the external electrode extracted from the image obtained by scanning the cross section of the multilayer ceramic capacitor in the length and thickness (L-T) directions taken in the central portion of the multilayer ceramic capacitor in the width (W) direction using the SEM, as shown in FIG. 2.

Figure 4:
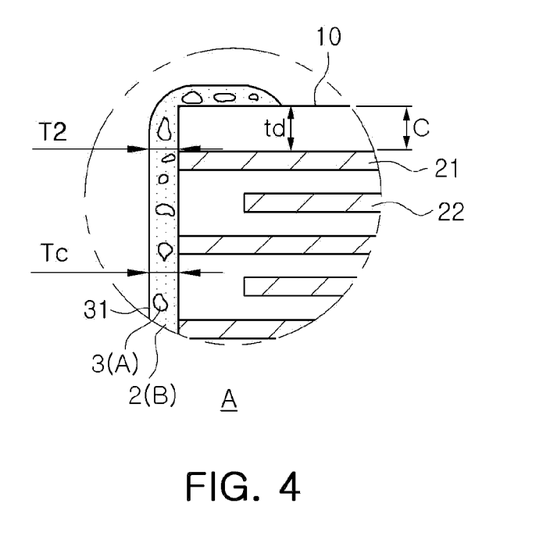
FIG. 4 is an enlarged view of part A of FIG. 2 according to another embodiment of the present invention.

FIG. 4 is an enlarged view of part A of FIG. 2 according to another embodiment of the present invention.

Referring to FIG. 4, in a multilayer ceramic electronic component according to another embodiment of the present invention, an average thickness td of the cover layer C in the cross-section of the ceramic body 10 in the length and thickness (L-T) directions taken in the central portion of the ceramic body 10 in the width (W) direction is 15 µm or less, the external electrodes 31 and 32 include the conductive metal 2 and the glass 3, when an area of the external electrodes 31 and 32 occupied by the glass 3 is A and an area thereof occupied by the conductive metal 2 is B, $0.05 \leq A/B \leq 0.6$ may be satisfied, and when a thickness of the external electrodes 31 and 32 in the central portion of the ceramic body 10 in the thickness direction is Tc and a thickness of the external electrodes 31 and 32 at the outermost point of the capacitance forming part at which the plurality of internal electrodes 21 and 22 are formed is T2, $T2/Tc \geq 0.5$ may be satisfied.

The thickness T2 of each external electrode 31 and 32 at the outermost point of the capacitance forming part at which the plurality of internal electrodes 21 and 22 are formed refers to a thickness of each external electrode at a point at which an imaginary line is drawn through the ceramic body 10 in the length direction thereof at the outermost point at which the plurality of internal electrodes 21 and 22 are formed.

A ratio of T2 to Tc satisfies 0.5 or more to thereby decrease deviation between the thickness Tc of each external electrode 31 and 32 in the central portion of the ceramic body 10 in the thickness direction and the thickness T2 of each external electrode 31 and 32 at the outermost point at which the plurality of internal electrodes 21 and 22 are formed, whereby the deterioration of reliability may be prevented.

In the case in which the ratio of T2 to Tc is less than 0.5 or less, since the deviation in the thickness of the external electrode is large, the plating solution may permeate into a relatively thin portion of the external electrode, such that reliability may be deteriorated.

Since the other characteristics of the multilayer ceramic electronic component according to this embodiment of the present invention are the same as those of the multilayer ceramic electronic component according to the above-described embodiment, a description thereof will be omitted.

In the multilayer ceramic electronic components according to the embodiments of the present invention, the external electrodes 31 and 32 may include the conductive metal 2 and the glass 3, and the glass 3 may have a content of 30 to 200 vol % based on the conductive metal 2, which is not limited thereto.

The external electrodes 31 and 32 include the glass 3 having a content of 30 to 200 vol % based on a content of the conductive metal 2, such that the content of glass 3 is significantly increased. Therefore, even in the case in which the external electrode is thinned, the ceramic body 10 may have excellent sealing properties.

Therefore, the multilayer ceramic capacitor according to the embodiments of the present invention has improved high temperature insulation resistance (IR) characteristics, such that the reliability thereof may be excellent.

In addition, even in the case that the thickness of the external electrode is reduced, the content of the glass is increased, such that compactness of the thin portion of the external electrode may be increased, thereby preventing the deterioration of reliability due to the permeation of the plating solution thereinto.

In the case in which the content of the glass 3 is less than 30 vol % based on the content of the conductive metal 2, the content of the glass may be insufficient, such that sufficient ceramic body sealing properties may not be obtained.

In addition, in the case in which the content of the glass 3 is more than 200 vol % based on the content of the conductive metal 2, the content of the glass may be excessively high, such that the glass may move the conductive metal to thereby tear the external electrode, and non-plating defects may be generated due to the elution of the glass and the level of capacitive contact may be deteriorated due to the deterioration of connectivity between the internal electrodes and the external electrodes.

Figure 5:
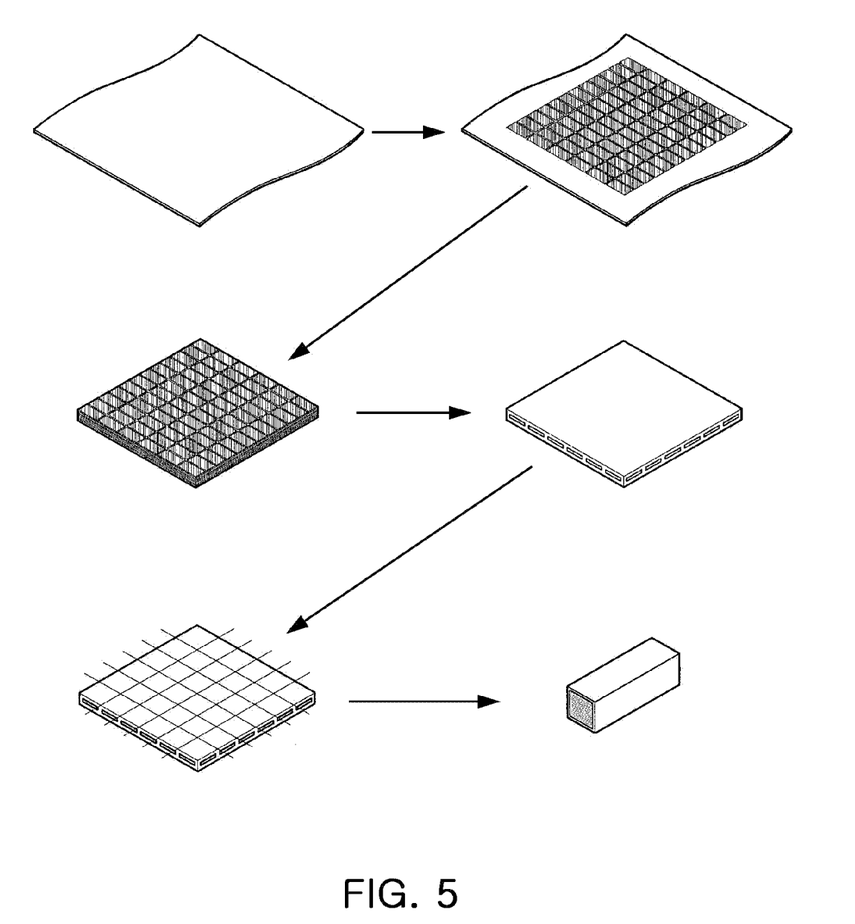
FIG. 5 is a view showing a process of fabricating a multilayer ceramic capacitor according to another embodiment of the present invention.

FIG. 5 is a view showing a process of fabricating a multilayer ceramic capacitor according to another embodiment of the present invention.

Referring to FIG. 5, a method of fabricating a multilayer ceramic electronic component according to another embodiment of the present invention may include: preparing a ceramic body including a dielectric layer and a plurality of internal electrodes disposed to face each other, having the dielectric layer interposed therebetween; applying an external electrode paste to the ceramic body to be electrically connected to the plurality of internal electrodes; and forming external electrodes by sintering the ceramic body, wherein the ceramic body includes an active layer corresponding to a capacitance forming part and a cover layer C formed on at least one of an upper surface and a lower surface of the active layer and corresponding to a non-capacitance forming part, an average thickness td of the cover layer C in a cross-section of the ceramic body in length and thickness (L-T) directions taken in a central portion of the ceramic body in a width (W) direction thereof is 15 µm or less, the external electrodes include a conductive metal and a glass, and when an area of the external electrodes occupied by the glass is A and an area thereof occupied by the conductive metal is B, $0.05 \leq A/B \leq 0.6$ is satisfied.

When a thickness of the external electrode in the central portion of the ceramic body in the thickness direction thereof is Tc and a thickness of the external electrode at a point spaced apart from a central portion of the capacitance forming part by a distance equal to 25% of a length S of the ceramic body in the thickness direction is T1, $T1/Tc \geq 0.8$ may be satisfied.

In the case in which the above conditions are satisfied, humidity resistance characteristics may be improved and the permeation of the plating solution may be prevented.

When the thickness of the external electrode in the central portion of the ceramic body in the thickness direction is Tc and a thickness of the external electrode at the outermost point of the capacitance forming part at which the plurality of internal electrodes are formed is T2, T2/Tc≥0.5 may be satisfied.

In the case in which the above conditions are satisfied, humidity resistance characteristics may be improved and the permeation of the plating solution may be prevented.

The glass may have a content of 30 to 200 vol % based on the conductive metal.

A description of the method of fabricating the multilayer ceramic electronic component according to this embodiment of the present invention overlapped with the description of the multilayer ceramic electronic components according to the above-described embodiments of the present invention will be omitted.

Hereinafter, the method of fabricating the multilayer ceramic electronic component according to the embodiment of the present invention will be described in detail. In particular, a method of fabricating a multilayer ceramic capacitor will be described. However, the present invention is not limited thereto.

First, the ceramic body 10 including the dielectric layer 1 and the plurality of internal electrodes 21 and 22 disposed to face each other, having the dielectric layer 1 interposed therebetween, may be prepared.

The dielectric layer 1 may be formed of a ceramic green sheet prepared to have a thickness of several μm by applying a slurry formed by mixing a powder such as a barium titanate (BaTiO$_3$) powder, or the like, with a ceramic additive, an organic solvent, a plasticizer, a binder, and a dispersant using a basket mill to a carrier film and drying the same.

Then, the internal electrode may be formed by dispensing a conductive paste on the green sheet and moving a squeegee in a single direction.

Here, the conductive paste may be formed of one of precious metal such as silver (Ag), lead (Pb), platinum (Pt), or the like, nickel (Ni), and copper (Cu), or a mixture of at least two materials thereof.

After the internal electrodes are formed as described above, a laminated body may be formed by separating the green sheet from the carrier film and then laminating a plurality of green sheets in an overlapping scheme.

Then, a ceramic body may be fabricated by compressing the laminated body at high temperature and high pressure and then cutting the compressed laminated body to have a predetermined size.

Next, an external electrode paste, including a conductive metal and a glass in which the content of the glass is 30 to 200 vol % based on the content of the conductive metal, may be prepared.

The conductive metal may be at least one selected from a group consisting of copper (Cu), nickel (Ni), silver (Ag), and sliver-palladium (Ag—Pd).

In addition, the glass may be an insulating glass, but is not limited thereto.

Next, the external electrode paste may be applied to the ceramic body 10 to be electrically connected to the plurality of internal electrodes 21 and 22.

Lastly, the external electrodes 31 and 32 may be formed by sintering the ceramic body 10.

Hereinafter, although the present invention will be described in detail with reference to Comparative and Inventive Examples, the present invention should not be construed as being limited thereto.

The present embodiment was practiced in order to test a capacitance defect rate and reliability according to an average thickness td of a cover layer C in a cross-section of a ceramic body in length and thickness (L-T) directions taken in a central portion of the ceramic body in a width (W) direction thereof, and a ratio of an area A of external electrodes occupied by glass to an area B thereof occupied by a conductive metal.

The multilayer ceramic capacitor according to the present embodiment was fabricated as follows.

First, a slurry containing a powder such as a barium titanate (BaTiO$_3$) powder, or the like, was applied to a carrier film and dried to prepare a plurality of ceramic green sheets, thereby forming a dielectric layer.

Next, a conductive paste for internal electrodes in which an average size of nickel particles is 0.05 to 0.2 μm was prepared.

The conductive paste for internal electrodes was applied to the green sheets using a screen printing method to thereby form internal electrodes and 50 layers of green sheets were then laminated to thereby form a laminated body.

Then, the laminated body was compressed and cut to thereby form a chip having a 0603 standard size, and the chip was sintered at a temperature of 1050 to 1200° C. under a reducing atmosphere in which H$_2$ was 0.1% or less.

Next, external electrodes were formed and processes such as a plating process, and the like were performed on the external electrodes to thereby fabricate a multilayer ceramic capacitor.

The following table 1 shows reliability comparison results according to the average thickness td of the cover layer C in the cross-section of the ceramic body in the length and thickness directions taken in the central portion of the ceramic body in the width direction.

The multilayer ceramic capacitor was fabricated to allow the ratio of the area A occupied by the glass to the area B occupied by the conductive metal in the external electrodes to be outside of the numerical range of the present invention, for example, the ratio was 0.03, and then the test was performed.

In addition, reliability was measured by a high temperature acceleration lifespan test, and the number of defects generated under conditions of 130° C., 1.5 Vr (9.45 V), and 6 hours was evaluated.

TABLE 1

| Sample | Average Thickness (td) of Cover Layer (μm) | Reliability Defects (Number of Defects/Total Number) |
| --- | --- | --- |
| 1 | 50 | 0/40 |
| 2 | 30 | 0/40 |
| 3 | 16 | 0/40 |
| 4* | 15 | 2/40 |
| 5* | 13 | 3/40 |

Referring to Table 1, it may be appreciated that in samples 1 to 3 corresponding to the cases in which the average thicknesses of the cover layer were 50 μm, 30 μm, and 16 μm, respectively, the thickness of the cover layer was thick, which was not problematic in terms of reliability defects.

Meanwhile, it may be appreciated that in samples 4 and 5 corresponding to the cases in which the average thickness of the cover layer was 15 μm or less, the thickness of the cover layer was thin, such that the ratio of the area A occupied by the glass to the area B occupied by the conductive metal in the external electrode was outside of the numerical range of the present invention, causing reliability problem.

Therefore, it may be appreciated that in the multilayer ceramic electronic component according to the present embodiment of the present invention having the average thickness of the cover layer of 15 μm or less, reliability could be improved only in the case in which the ratio of the area A of the external electrode occupied by the glass to the area B thereof occupied by the conductive metal satisfies the numerical range of the present invention.

The following Table 2 shows comparison results of a capacitance defect rate and reliability according to the ratio of the area A occupied by the glass to the area B occupied by the conductive metal in the external electrode of the multilayer ceramic capacitor.

In addition, testing was performed under conditions in which the average thickness of the cover layer was 15 μm.

Reliability was measured by a high temperature acceleration lifespan test and the number of defects generated under conditions of 130° C., 1.5 Vr (9.45 V), and 6 hours was evaluated.

TABLE 2

| | Area A Occupied By Glass/Area B Occupied by Conductive Metal (A/B) | Reliability Defects (Number of Defects/ Total Number) | Capacitance Defect Rate (%) |
|---|---|---|---|
| Comparative Example 1 | 0.01 | 3/40 | 0 |
| Comparative Example 2 | 0.03 | 2/40 | 0 |
| Inventive Example 1 | 0.05 | 0/40 | 0 |
| Inventive Example 2 | 0.1 | 0/40 | 0 |
| Inventive Example 3 | 0.3 | 0/40 | 0 |
| Inventive Example 4 | 0.5 | 0/40 | 0 |
| Inventive Example 5 | 0.6 | 0/40 | 0 |
| Comparative Example 3 | 0.65 | 0/40 | 10 |
| Comparative Example 4 | 0.7 | 0/40 | 10.9 |
| Comparative Example 5 | 0.8 | 0/40 | 12.5 |

Referring to Table 2, it may be appreciated that Comparative Examples 1 and 2, corresponding to the cases in which the ratio of the area A occupied by the glass to the area B occupied by the conductive metal was outside of the numerical range of the present invention, were problematic in terms of reliability.

In addition, it may be appreciated that in Comparative Examples 3 to 5 corresponding to the cases in which the ratio of the area A occupied by the glass to the area B occupied by the conductive metal was outside of the numerical range of the present invention, capacitance defects were generated.

Meanwhile, it may be appreciated that Inventive Examples 1 to 5 satisfying the numerical range of the present invention showed excellent results both in terms of the capacitance defect rate and reliability.

Consequently, according to the embodiments of the present invention, in the case in which the average thickness of the cover layer is 15 μm or less, when the ratio of the area A occupied by the glass to the area B occupied by the conductive metal in the external electrodes satisfies the numerical range of the present invention, the multilayer ceramic electronic component has a low capacitance defect rate and excellent reliability.

As set forth above, according to embodiments of the present invention, a multilayer ceramic electronic component has improved reliability by preventing the permeation of a plating solution.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
   a ceramic body including a dielectric layer;
   a plurality of internal electrodes disposed to face each other within the ceramic body, having the dielectric layer interposed therebetween; and
   external electrodes electrically connected to the plurality of internal electrodes,
   wherein the ceramic body includes an active layer corresponding to a capacitance forming part and a cover layer formed on at least one of an upper surface and a lower surface of the active layer and corresponding to a non-capacitance forming part,
   an average thickness of the cover layer in a cross-section of the ceramic body in length and thickness directions taken in a central portion of the ceramic body in a width direction is 15 μm or less,
   the external electrodes include a conductive metal and a glass, and
   when an area of the external electrodes occupied by the glass is A and an area thereof occupied by the conductive metal is B, $0.05 \leq A/B \leq 0.6$ is satisfied.

2. The multilayer ceramic electronic component of claim 1, wherein when a thickness of the external electrode in the central portion of the ceramic body in the thickness direction is Tc and a thickness of the external electrode at a point spaced apart from a central portion of the capacitance forming part by a distance equal to 25% of a length of the ceramic body in the thickness direction is T1, $T1/Tc \geq 0.8$ is satisfied.

3. The multilayer ceramic electronic component of claim 1, wherein when a thickness of the external electrode in the central portion of the ceramic body in the thickness direction is Tc and a thickness of the external electrode at the outermost point of the capacitance forming part at which the plurality of internal electrodes are formed is T2, $T2/Tc \geq 0.5$ is satisfied.

4. The multilayer ceramic electronic component of claim 1, wherein the glass has a content of 30 to 200 volume % based on the conductive metal.

5. The multilayer ceramic electronic component of claim 1, wherein the conductive metal is at least one selected from a group consisting of copper (Cu), nickel (Ni), silver (Ag), and silver-palladium (Ag—Pd).

6. The multilayer ceramic electronic component of claim 1, wherein the glass has insulating properties.

7. A method of fabricating a multilayer ceramic electronic component, the method comprising:
   preparing a ceramic body including a dielectric layer and a plurality of internal electrodes disposed to face each other, having the dielectric layer interposed therebetween;
   applying an external electrode paste to the ceramic body to be electrically connected to the plurality of internal electrodes; and
   forming external electrodes by sintering the ceramic body,
   wherein the ceramic body includes an active layer corresponding to a capacitance forming part and a cover layer formed on at least one of an upper surface and a lower surface of the active layer and corresponding to a non-capacitance forming part, an average thickness of the cover layer in a cross-section of the ceramic body in length and thickness directions taken in a central portion of the ceramic body in a width direction is 15 μm or less, the external electrodes include a conductive metal and a glass, and when an area of the external electrodes occupied by the glass is A and an area thereof occupied by the conductive metal is B, $0.05 \leq A/B \leq 0.6$ is satisfied.

8. The method of claim 7, wherein when a thickness of the external electrode in the central portion of the ceramic body in the thickness direction is Tc and a thickness of the external electrode at a point spaced apart from a central portion of the capacitance forming part by a distance equal to 25% of a length of the ceramic body in the thickness direction is T1, $T1/Tc \geq 0.8$ is satisfied.

9. The method of claim 7, wherein when a thickness of the external electrode in the central portion of the ceramic body in the thickness direction is Tc and a thickness of the external electrode at the outermost point of the capacitance forming part at which the plurality of internal electrodes are formed is T2, $T2/Tc \geq 0.5$ is satisfied.

10. The method of claim 7, wherein the glass has a content of 30 to 200 volume % based on the conductive metal.

11. The method of claim 7, wherein the conductive metal is at least one selected from a group consisting of copper (Cu), nickel (Ni), silver (Ag), and silver-palladium (Ag—Pd).

12. The method of claim 7, wherein the glass has insulating properties.

* * * * *